SIZER & OWEN.
Fertilizer.

No. 107,111.    Patented Sept. 6, 1870.

Witnesses:    Inventors:

United States Patent Office.

GEORGE WASHINGTON SIZER AND WILLIAM MILLER OWEN, OF NEW ORLEANS, LOUISIANA.

Letters Patent No. 107,111, dated September 6, 1870.

IMPROVEMENT IN GUANO-DISTRIBUTING MACHINE.

The Schedule referred to in these Letters Patent and making part of the same

We, GEORGE WASHINGTON SIZER and WILLIAM MILLER OWEN, of New Orleans, Louisiana, have jointly invented an Improved Guano-Distributing Machine, of which the following is a specification.

Our improvement consists of an arrangement of mechanical parts, in connection with a suitably-formed box, recipient, or holder for the guano, the whole being mounted on wheels, through the agency of which guano or any other fertilizer, provided it be desiccated and in the form of powder, can be applied on both sides of rows of sugar cane, Indian corn, and, indeed, any other agricultural product that is planted in rows, in a continuous stream, and in any desired quantity, after the coming up of the sugar cane or other product, at any time until the same has attained a growth which will prevent the machine from passing over it without contact with and injury to it.

The object of our invention is, in fact, to distribute guano or other equivalent fertilizer on each side of rows of sugar cane, after the same has made its appearance above ground, at one and the same time, in an economic and rapid manner, and in uniform measure or quantity from one end of said rows to the other everywhere over the field.

Figure 1:
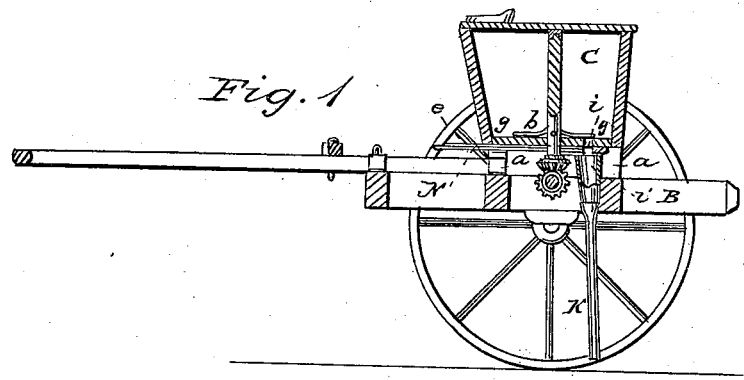
Figure 2:
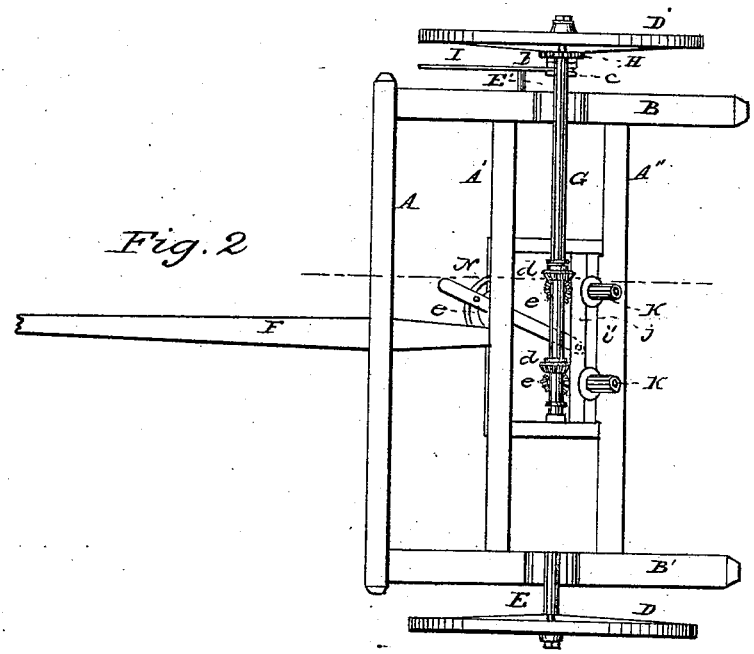

But our invention will be better understood, as well as more quickly, by referring to the drawing, on which it is shown, at Figure 1, by a sectional view through line *a b* of Figure 2, and at Figure 3 by a bottom view.

On a frame composed of three cross-bars, A A' A", and two longitudinal pieces, B B', is secured a box, C, of any suitable form, for holding the guano, by means of four short diverging legs, *a*, so as to have its bottom raised a few inches above the frame, as shown at fig. 1. This box is perforated at its bottom with two holes, at a proper distance apart to secure the precipitation of the guano, which drops through them and through two conduit-tubes immediately below them, which we will presently particularly describe, on each side of each row of sugar cane, in the fractional operation of the machine.

The frame on which this box is mounted is supported on wheels D D', by means of two short sectional axles, E E', or, in lieu thereof, a single axle, extending entirely across the machine, and it is provided with a tongue, F, and proper double-trees for attaching the draft animals to the machine.

In three journals, one secured on the top side of the piece of the frame marked B, and the two others in pendent arms that are fastened to the bottom of box C, is sustained an axle, G. This axle extends sufficiently outside the part B of the frame to bring the cog-wheel H, which is fitted loosely on its extremity, into connection with an exactly similar wheel, that is permanently secured to the hub of the wheel D'.

The cog or spur-wheel H is provided with a clutch, *b*, which corresponds precisely, but in reverse direction, with a sliding clutch, *c*, which is prevented from rotating by a feather-key on the said axle.

An annular groove around the clutch *c* provides for its connection with a lever, I, by means of a bifurcated or yoke extremity in said lever, while at the same time permitting the said clutch to revolve freely with the shaft G. The lever I and the sliding clutch *c* constitute our means for putting in motion and stopping the axle G, and, therefore, of distributing or not, the fertilizer at our pleasure.

On the axle G, underneath the box C, as shown, we place two miter or bevel-pinions, *d d*, which gear into two corresponding pinions, *e e*, that are fixed on two vertical shafts, *f*, which pass up through the bottom of the box C, some inches in front of the holes for the discharge of the guano, to the top thereof, where they are steadied by a cross-bar, into which they enter by a reduced extremity, in such manner as to rotate freely.

From each of these vertical shafts project four or more radiating arms or stirrers, *g*, just above the bottom of the box C. These stirrers, as their name implies, subserve the purpose of agitating the fertilizer, with the view to prevent it from being packed into solid mass, and also of sweeping it over the discharge apertures or holes.

Underneath the said holes we secure two conduit-tubes, K, which, at their upper extremities, have short funnel-shaped metallic sections, to which India-rubber or gutta-percha tubes are attached, as shown at both the figures. The reason we make the conduit-tubes K, for most of their length, of India rubber or other elastic gum is, that they may yield on coming in contact with a stalk of sugar cane, Indian corn, or the like, and not break or injure the same, nor be themselves broken, if they should strike against a hard substance in the movement of the machine while at work, or in going from one place to another.

Just behind the discharge-openings, through the bottom of the box C, one of which is shown at fig. 1, marked *i*, a transverse bar, *i'*, is immovably fixed on the bottom of the said box, in such relation to the expanded upper extremities of the conduit-tubes, K as to cross the same, so as to cover only a small portion of the openings of the same, on their rear sides, as shown clearly at fig. 1. This bar *i'*, in connection with a movable bar *j*, to which a lever, M, is pivoted, as shown, constitutes our means for regulating and controlling the quantity of guano that is discharged, in the actual use or practice of our invention, to any prescribed measure. By a movement of the lever M in the one or the other direction, the bar $j$ is moved further from or closer to the bar $i'$, and, therefore, increases or diminishes the size of the opening $i$, as the case may be, and thereby causes the guano to be distributed in greater or lesser quantum, according to the quality of the land or the necessities of the occasion in any other regard.

The bar $j$ works close against the bottom of the box C, and between it and those portions of the upper extremities of the conduit-tubes K which are in front of the bar $i'$, the said portions of said tubes being sufficiently below the bottom of the box to allow the said bar to pass readily between them.

A thin metallic plate, that is secured to the cross-bar A of the frame so as to project in front of the same, as shown at both figures at N, is provided with a segmental or curved slot, $l$, through which a thumb-screw passes, and enters the lever, as seen at $o$, constitutes our means for holding the latter, and, through its agency, the movable bar $j$, also, in any given or desired position, and, therefore, of controlling the size of the openings $i$ at our pleasure, even up to the point of entirely closing them.

We have practically tested our invention, with a full-sized machine, in the field, and found it to be perfect in its operation in every respect, and almost entirely exempt from liability to get out of order.

What we claim is—

1. The axle G, cog-wheel H, clutches $b\ c$, beveled pinions $d\ d\ e\ e$, and vertical shafts $f\ f$, having arms or stirrers $g\ g$, when the same are so arranged as to be operated by the ratchet or toothed face of the hub of the wheel D', substantially as described.

2. The movable bar $j$, lever M, and plate N, when the same are so arranged, in connection with the stationary or check-bar $i$, on the under side of the hopper or box C, that the discharge of the guano through the tubes K K can be regulated and controlled substantially as described.

GEO. W. SIZER.
W. M. OWEN.

Witnesses:
A. S. ARMSTRONG,
RUFUS R. RHODES.